United States Patent
Quinn et al.

(10) Patent No.: US 7,599,686 B2
(45) Date of Patent: Oct. 6, 2009

(54) SYSTEMS AND METHODS FOR RF SPECTRUM MANAGEMENT

(75) Inventors: Liam B. Quinn, Austin, TX (US); Pratik M. Mehta, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 470 days.

(21) Appl. No.: 11/124,587

(22) Filed: May 6, 2005

(65) Prior Publication Data

US 2006/0252418 A1    Nov. 9, 2006

(51) Int. Cl.
*H04W 24/00* (2006.01)

(52) U.S. Cl. ............... 455/423; 455/41.2; 455/448; 455/450; 455/454; 455/522; 455/553.2; 370/329; 370/466

(58) Field of Classification Search ............ 455/448, 455/450, 552.1, 553.2, 41.2, 454, 423, 522; 370/329, 466
See application file for complete search history.

(56) References Cited

U.S. PATENT DOCUMENTS

| | | | |
|---|---|---|---|
| 5,933,420 | A | 8/1999 | Jaszewski et al. |
| 6,031,825 | A | 2/2000 | Kaikuranta et al. |
| 6,094,436 | A | 7/2000 | Runaldue et al. |
| 6,208,629 | B1 | 3/2001 | Jaszewski et al. |
| 6,373,848 | B1 | 4/2002 | Allison et al. |
| 6,560,234 | B1 | 5/2003 | Ben-Michael et al. |
| 6,694,141 | B1 | 2/2004 | Pulkkinen et al. |
| 6,697,013 | B2 | 2/2004 | McFarland et al. |
| 6,810,520 | B2 | 10/2004 | Lu et al. |
| 6,834,045 | B1 | 12/2004 | Lappetelainen et al. |
| 2002/0025778 | A1 | 2/2002 | Lee |
| 2002/0059453 | A1 | 5/2002 | Eriksson et al. |
| 2002/0061031 | A1* | 5/2002 | Sugar et al. ............... 370/466 |
| 2002/0155811 | A1* | 10/2002 | Prismantas et al. ........... 455/63 |
| 2002/0181418 | A1 | 12/2002 | Awater et al. |
| 2002/0188723 | A1 | 12/2002 | Choi et al. |
| 2003/0198200 | A1* | 10/2003 | Diener et al. ............. 370/329 |
| 2004/0116075 | A1* | 6/2004 | Shoemake et al. ......... 455/41.2 |
| 2004/0125775 | A1 | 7/2004 | Rios |
| 2004/0152416 | A1* | 8/2004 | Dahl ..................... 455/41.2 |
| 2004/0196812 | A1 | 10/2004 | Barber et al. |
| 2004/0199645 | A1 | 10/2004 | Rouhi |
| 2004/0264394 | A1 | 12/2004 | Ginzburg et al. |
| 2005/0003796 | A1* | 1/2005 | Kashiwase ................. 455/403 |
| 2005/0025182 | A1 | 2/2005 | Nazari |
| 2005/0074019 | A1 | 4/2005 | Handforth et al. |

(Continued)

FOREIGN PATENT DOCUMENTS

EP    1207654 A2    5/2002

(Continued)

OTHER PUBLICATIONS

"WiFi", http://webopedia.com/TERM/W/WiFi.html.*

(Continued)

*Primary Examiner*—Nghi H Ly
(74) *Attorney, Agent, or Firm*—O'Keefe, Egan, Peterman & Enders LLP (57) ABSTRACT

Systems and methods for managing RF spectrum use by two or more network computing wireless communication technologies operating in the same wireless communication environment.

30 Claims, 4 Drawing Sheets

U.S. PATENT DOCUMENTS

| | | | |
|---|---|---|---|
| 2005/0147071 | A1 | 7/2005 | Karaoguz et al. |
| 2005/0170776 | A1 | 8/2005 | Siorpaes |
| 2005/0259619 | A1 | 11/2005 | Boettle et al. |
| 2006/0160536 | A1 | 7/2006 | Chou |
| 2007/0002742 | A1 | 1/2007 | Krishnaswamy et al. |

FOREIGN PATENT DOCUMENTS

| | | | |
|---|---|---|---|
| EP | 1480388 | A2 | 4/2004 |
| EP | 1480388 | A2 | 11/2004 |
| GB | 2308789 | A | 7/1997 |
| GB | 2391137 | A1 | 1/2004 |
| GB | 2416462 | A | 1/2006 |
| WO | WO2004/027635 | A1 | 4/2004 |
| WO | WO2004/036770 | A2 | 4/2004 |
| WO | WO2004/039111 | A1 | 5/2004 |
| WO | WO2004/088886 | A2 | 10/2004 |
| WO | WO2004/105320 | A1 | 12/2004 |
| WO | WO2004/107779 | A2 | 12/2004 |
| WO | WO2005/008938 | A2 | 1/2005 |

OTHER PUBLICATIONS

"Multiple Channel Scheduling in UWB based IEEE based 802.15.3 Networks", Aniruddha Rangnekar, Krishna M. Sivallingam, Jan. 2004, Abstract, p. 1, Introduction: paragraphs 1-2, http://ieeexplore.ieee.org/iel5/9413/29881/01363829.pdf.*

See, "802.11h Helps WLANs Share Spectrum", NetworkWorldFusion, http://www.nwfusion.com/news/tech/2004/071904techupdate.html, printed from Internet Apr. 13, 2005, 7 pgs.

Cox, "Keep Track Of The 802.11 Alphabet Soup", TechWorld, http://www.techworld.com/mobility/features/index.cfm?FeatureID=1065, printed from Internet Feb. 20, 2005, 5 pgs.

Neel et al., "Wireless, Wireless Everywhere and Now It Starts To Think", EE Times On Line, http://eetimes.com/consumer/showArticle.jhtml?articleID=51200473, Dated Nov. 1, 2004, Printed from Internet May 4, 2005, 8 pgs.

"IEEE 802.16' And WiMax, Broadband Wireless Access For Everyone", Intel White Paper, 2003, 8 pgs.

"IEEE 802.16a Standard And WiMax Igniting Broadband Wireless Access", White Paper, Printed from Internet on May 4, 2005, 7 pgs.

Copending Application, "Systems And Methods For Distribution Of Wireless Network Access", U.S. Appl. No. 11/189,289, filed Jul. 26, 2005, 22 pgs.

Intel PRO/Wireless 5116 Broadband Interface, "Innovation For WiMax Fixed Wireless Broadband Platforms", Product Brief, Copyright 2005, Printed from Internet Jul. 25, 2005, 2 pgs.

Intel PRO/Wireless 5116 Broadband Interface, "Innovation For WiMax Fixed Wireless Broadband Platforms", Printed from Internet Jul. 25, 2005, http://www.intel.com/network/connectivity/products/wireless/prowireless_5116.htm, 2 pgs.

WiMax Broadband Wireless Access Technology, Connecting To Next Billion People, Printed from Internet Jul. 25, 2005, http:www.intel.com/netcomms/technologies/wimax/index.htm, 2 pgs.

Search Report, Application No. SG200602874-0, Sep. 18, 2006, 5 pgs.

* cited by examiner

SYSTEMS AND METHODS FOR RF SPECTRUM MANAGEMENT

BACKGROUND OF THE INVENTION

1. Field of the Invention

This invention relates generally to wireless communications, and more particularly to management of radio frequency (RF) spectrum use in wireless communication environments.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are employed in network communication environments. The growth of the Broadband network communication market continues to exceed expectations and is expected to reach over 500 million users by the year 2005. High speed Internet access has enabled the development of new applications and new usage models for traditional and non-traditional services and applications, particularly in the emerging Digital Home, Enterprise and small and medium business (SMB) networking environments. An example of this is new classes of multimedia devices with support for high definition television (HDTV) and high speed Internet access.

Currently, there are numerous Router based products and Wireless Gateway products that may be employed to form the bridge between high speed broadband access networks (e.g., Cable, DSL) and local wired and 802.11 Wi-Fi networks in the home and other locations. Technology for these products is specific to broadband access method, embedded controllers, network address translation (NAT), security and routing software employed. There are many methods and approaches available to connect high speed devices into a wired network environment using Ethernet based protocol and cabling systems. However, there are many challenges implementing the same architecture using a wireless medium to provide roaming and location independent placement of multimedia and other Digital Home devices such as storage, displays and I/O peripherals.

In a modern wireless communication environment, there may be numerous types of peripherals and devices that wirelessly connect to each other and/or to the network within the environment and communicate over unlicensed exempt RF frequencies. Included among the various wireless technologies that may coexist within the same wireless communication environment are those network related wireless technologies that are implemented as part of wireless wide area networks (WWANs), wireless local area networks (WLANs), wireless metropolitan area networks (WMANs) and wireless personal area networks (WPANs). There may also be other wireless devices (e.g., cordless phones, microwave ovens, military radar, etc.) transmitting or receiving information using non-network wireless technologies within range of the network-related devices and peripherals. The possible operating frequencies of these various network and non-network related technologies often overlap within the available unlicensed wireless radio frequency (RF) spectrum, creating the potential for interference between the devices. At the same time, the proliferation and deployment of most wireless devices is in the unlicensed spectrum, e.g., cordless phones, WLANs, WPANs, etc. Because the unlicensed wireless RF spectrum is unregulated and unprotected by regulations, there is a much higher probability of encountering interference problems.

Examples of specific network related wireless technologies that at least in part utilize the unlicensed RF spectrum include, but are not limited to, WLAN technologies such as 802.11 Wireless Fidelity (WiFi) (2.4 GHz and 5.0 GHz); WPAN based technologies such as Bluetooth (2.4 GHz) and UWB (3.1-10.6 GHz); WWAN based technologies such as GSM/EDGE, HSDPA, W-CDMA, CDMA-2000 (800-900 MHz, 1800-1900 MHz and 2.1 GHz); WMAN based technologies such as 802.16 WiMax (2-11 GHz), etc.

In an attempt to address potential interference between 802.11a WLAN network communications and other devices (e.g., other WiFi WLAN access point segments, and primary-use devices such as military radar systems or satellite devices), the IEEE 802.11h+d standard was developed to implement dynamic frequency selection (DFS) and transmit power control (TPC). DFS detects other devices using the same RF channel and is used by a wireless network access point to switch the RF channel of current WLAN operation to another RF channel to avoid interference. TPC adjusts RF transmit power to reduce interference with other devices and is used by a wireless network access point to manage power consumption, and/or to control range between access points and wireless devices.

SUMMARY OF THE INVENTION

Disclosed herein are systems and methods for managing RF spectrum use (e.g., RF spectrum allocation, RF transmission power, etc.) by two or more network computing wireless technologies operating in the same wireless communication environment (e.g., operating at the same physical location, etc.). Among other things, the disclosed systems and methods may be employed to intelligently monitor usage characteristics for a given RF spectrum (e.g., identity of used and non-used RF channels within the RF spectrum, transmission power characteristics of at least one of the network computing wireless technologies operating within the RF spectrum, presence of non-network or interfering signals within the RF spectrum, etc.) for a given wireless communication environment, and to dynamically adjust use of the given RF spectrum by at least one of the two or more coexisting network computing wireless technologies that are communicating within the given wireless communication environment based at least in part on the sensed usage characteristics (e.g., adjusting the allocation of the RF spectrum between the two or more coexisting network computing wireless technologies, adjusting the RF signal transmission power levels of at least one of the two or more coexisting network computing wireless technologies, etc.). Among other things, the disclosed systems and methods may be advantageously implemented to so manage spectrum of a wide variety of networking computing wireless technologies as they may be deployed to enable network communications for a wide variety of network types, e.g., WWANs, WLANs, WMANs, WPANs, etc. The disclosed systems and methods may also be advantageously implemented for local spectrum management, i.e., spectrum management in the locality of the devices.

The disclosed systems and methods may be implemented in one embodiment using a method and architectural model that advantageously enables the sharing of data and high speed multimedia content across the information handling systems of heterogeneous wireless platforms that are operating within a common wireless communication environment (e.g., home or office computing wireless communication environment/s) in the presence of other competing and interfering RF noise sources. For example, such an architectural model and method may be implemented to provide guaranteed delivery of time sensitive multimedia content and best effort data access between the respective information handling systems of an end-station and a base station operating within the common wireless communication environment. The end station information handling system may be any one of many types of information handling systems suitable for use as a network computing end station, such as a multimedia PC, an intelligent HDTV subsystem, a multimedia adapter, etc. The base station information handling system may be any one of many types of information handling systems suitable for use as a network computing base station, such as a wireless router, wireless access point, "smart switch" with multiple wireless technologies, wireless set-top box, wireless digital devices (e.g., wireless home game consoles), etc.

When implemented to allocate a given RF spectrum for network computing communications in a wireless communication environment, the disclosed systems and methods may advantageously employ one or more aspects of existing frequency selection methodology to manage spectrum allocation for a given wireless technology. For example, in one exemplary embodiment the disclosed systems and methods may be implemented to manage RF spectrum allocation for 802.11 WiFi network and ultra wide band (UWB) communications in a given wireless communication environment. In such an exemplary embodiment, the disclosed systems and methods may be implemented to advantageously employ one or more aspects of IEEE 802.11h and/or 802.11d standards for spectrum management and/or channel reuse, thus leveraging high speed 802.11 Wi-Fi with its native 802.11 h+d features, and UWB to enable segmentation of the available spectrum, for example, into the following two usage models: 1) IEEE 802.11 a/b/g/n for high speed WLAN data transport; and 2) UWB for point-to-point in-room high speed multimedia links. Thus, the disclosed systems and methods may be implemented to enable intelligent segmentation of wireless usage models, based on a plurality of wireless transport methods, towards different application types.

In one embodiment of the disclosed systems and methods, a method for wireless communication spectrum management may be implemented to: 1) determine and profile the wireless spectrum use; 2) change wireless power and channel allocation (e.g. using 802.11h+d); and 3) use the appropriate wireless transport to move the applications based on one or more application characteristics such as priority, latency and bandwidth requirements. For example, the disclosed systems and methods may be implemented in one exemplary embodiment to provide a wireless communication spectrum management architecture that includes an array of antennas that are configured to sense the available spectrum for simultaneous operation of two or more different wireless technologies (e.g., 802.11 and UWB technologies). With multiple-in multiple out (MIMO) antenna structures, the architecture may be implemented to profile the available wireless spectrum and pre-assign specific spectrum masks based on usage models and applications. In an embodiment configured to manage spectrum allocation for 802.11 and UWB technologies, the architecture may employ the 802.11 abgn standard to provide a wireless transport operating over 2.4 and 5 GHz license-exempt frequency bands for data access. An intelligent wireless switch may be implemented, e.g., in a wireless network access point, that utilizes the 802.11h+d support for DFS and TPC provided within the 802.11 abgn standard to map out and manage the spectrum usage for the two competing 802.11 and UWB wireless technologies while ensuring co-existence between the multiple transmitters and receivers.

By taking advantage of the inherent support for dynamic frequency allocation and power spectral density provided by the 802.11h+d standard, the disclosed systems and methods may be implemented in one embodiment to provide scalability of wireless intelligent RF spectrum management, e.g., intelligent wireless switch features, for WLAN operation in multiple regulatory domains, and to provide smart radio behavior in radar avoidance and transmit power control. Thus, features of the 802.11 WLAN standards may be advantageously leveraged in conjunction with overlapping frequencies in the UWB band to provide intelligent reuse and management of the RF spectrum. In this regard, UWB with its native quality of service (QoS) support, coupled with its low power and noise threshold make it an ideal wireless transport for latency sensitive multimedia content, particularly over a relatively short distance of from about 1 to about 5 meters (e.g., within a room).

In one exemplary embodiment, the disclosed systems and methods may be implemented to enable the deployment of remote multimedia platforms within 'personal' room enclosures for sharing of the multimedia content from a base station entity, or a similar broadband termination platform. The intelligent reuse of shared spectrum by two wireless technology architectures advantageously ensures a duality of operation and delivery of time sensitive high bandwidth content over a short distance, in addition to ensuring the availability of a reliable WLAN network required for high speed internet sharing in fixed or mobile mode.

In one respect, disclosed herein is a wireless network access point including an information handling system configured to manage RF spectrum use by two or more network computing wireless technologies operating in the same wireless communication environment.

In another respect, disclosed herein is an information handling system configured as a wireless network access point, the information handling system including: a first wireless network technology communication component configured to communicate using a first network computing wireless technology; a second wireless network technology communication component configured to communicate using a second network computing wireless technology; and an RF spectrum controller coupled to control operation of the first and second wireless network technology communication components.

In another respect, disclosed herein is an RF spectrum management method, including using an information handling system configured as a wireless network access point to manage RF spectrum use by two or more network computing wireless technologies operating in the same wireless communication environment.

DESCRIPTION OF ILLUSTRATIVE EMBODIMENTS

Figure 1:
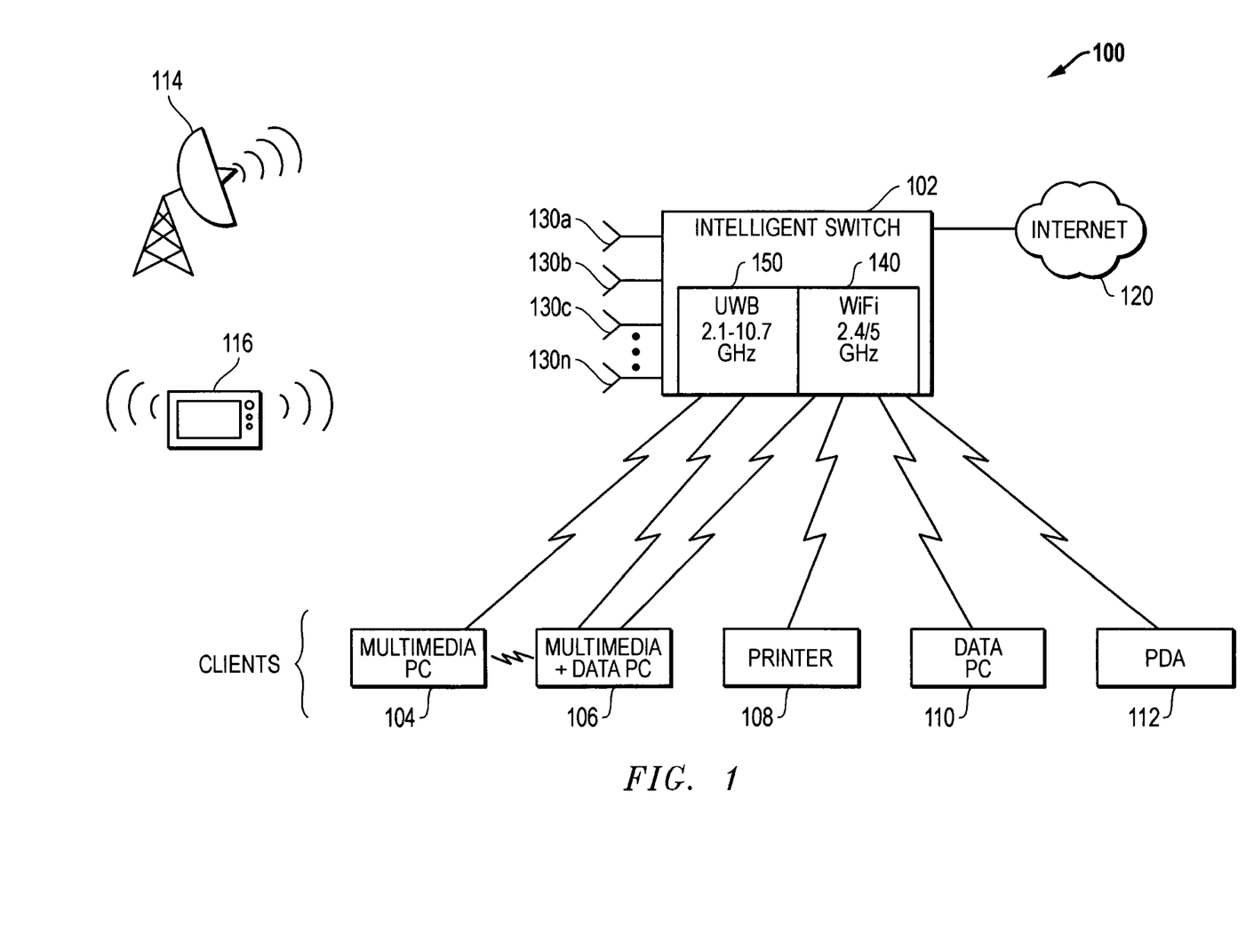
FIG. 1 is a simplified block diagram of a wireless communications environment according to one exemplary embodiment of the disclosed systems and methods.

FIG. 1 is a block diagram of a wireless communications environment 100 in which the disclosed systems and methods may be implemented according to one exemplary embodiment to manage unlicensed RF spectrum use (e.g., RF spectrum allocation, RF transmission power, etc.). As shown, wireless communications environment 100 includes an information handling system 102 configured as a network computing access point device acting as an intelligent switch that is coupled to communicate with an external network in the form of Internet 120 (e.g. via Broadband connection such as DSL, Satellite or Cable modem) and with a number of exemplary network computing client wireless devices 104, 106, 108, 110 and 112 that may be encountered by a user of a given wireless network within a particular physical location (e.g., home, office, etc.). In this regard, it will be understood that a wireless network access point (such as access point 102) may be configured according to the disclosed systems and methods to be coupled to one or more external networks (that may include or not include the Internet), or alternatively may not be coupled to such an external network (i.e., an access point may be configured to operate in stand-alone mode). Although this embodiment is described with regard to management of unlicensed RF spectrum use, it will be understood that the disclosed systems and methods may also be implemented to manage licensed RF spectrum use.

As shown in the exemplary embodiment of FIG. 1, access point 102 is configured to communicate with client wireless devices via UWB and WiFi wireless technologies, and to manage inter-device communication between the client wireless devices, e.g., such as communications between client wireless devices 104 and 106 as shown in FIG. 1 and/or communications between any other of devices 104, 106, 108, 110 and 112 of FIG. 1. In this regard, communications between individual client wireless devices is routed through access point 102 via suitable radio and processing components. Specifically, access point 102 includes UWB communication component 150 that communicates with multimedia personal computer (PC) 104 and multimedia and data PC 106 via UWB wireless technology. Access point 102 also includes WiFi communication component 140 that communicates with multimedia and data PC 106, printer 108, data PC 110 and personal data assistant (PDA) 112 via 802.11 WiFi wireless technology. As shown, access point 102 also includes a wireless environment monitor in the form of an antenna array that includes antenna elements 130a to 130n that monitors RF characteristics (e.g., presence and strength of RF signals, presence and strength of RF interference, etc.) of wireless communication environment 100. It being understood that wireless environment monitor may take the form of any other monitoring structure or device suitable for monitoring a wireless communication environment in a manner as described elsewhere herein.

It will be understood that the illustrated embodiment of FIG. 1 is exemplary only, and that features of an intelligent switch may be implemented in other embodiments to communicate with the illustrated types of client wireless devices and/or other types of client wireless devices using the illustrated types of wireless technologies and/or any other types of wireless technologies suitable for network communications. It will also be understood that features of an intelligent switch may be implemented using radio components configured to communicate with client wireless devices using a combination of any two or more different types of wireless technologies (e.g., three or more different types of wireless technologies, four or more different types of wireless technologies, etc.) within a given wireless communication environment.

Also illustrated in FIG. 1 are RF devices 114 and 116 that represent sources of non-network related RF energy within range of the wireless devices of FIG. 1 that are operating in network computing environment 100. These RF devices/sources may include, for example, microwave oven 116 and commercial or military radar 114 having operating frequencies that overlap with the UWB and WiFi RF spectrum used by the wireless network devices of FIG. 1, creating the potential for interference with these wireless network devices. From the perspective of the network computing environment, the RF emissions of such devices may usually be characterized as uncontrollable. It will be understood that devices 114 and 116 are exemplary only, and that any one or more of these or other types of sources of non-network related RF energy (e.g., other interfering broadband communication technologies) may be present within range of all or part of a wireless networking communication environment such as illustrated in FIG. 1.

As will be described further herein, one or more wireless network access points (e.g., access point 102) may be configured according to one embodiment of the disclosed systems and methods to manage RF spectrum use by two or more wireless communication technologies (e.g., UWB and WiFi) and associated wireless client devices (e.g., wireless client devices 104, 106, 108, 110 and 112) operating in the same wireless communication environment (e.g., wireless communication environment 100). In this regard, a wireless network access point may be configured to control the communication channels employed for communication by one or more connected wireless client devices, e.g., to implement local dynamic spectrum allocation by dynamically initiating change of communication channels in a manner that causes one or more of the connected wireless client devices to follow the channel change.

Figure 2:
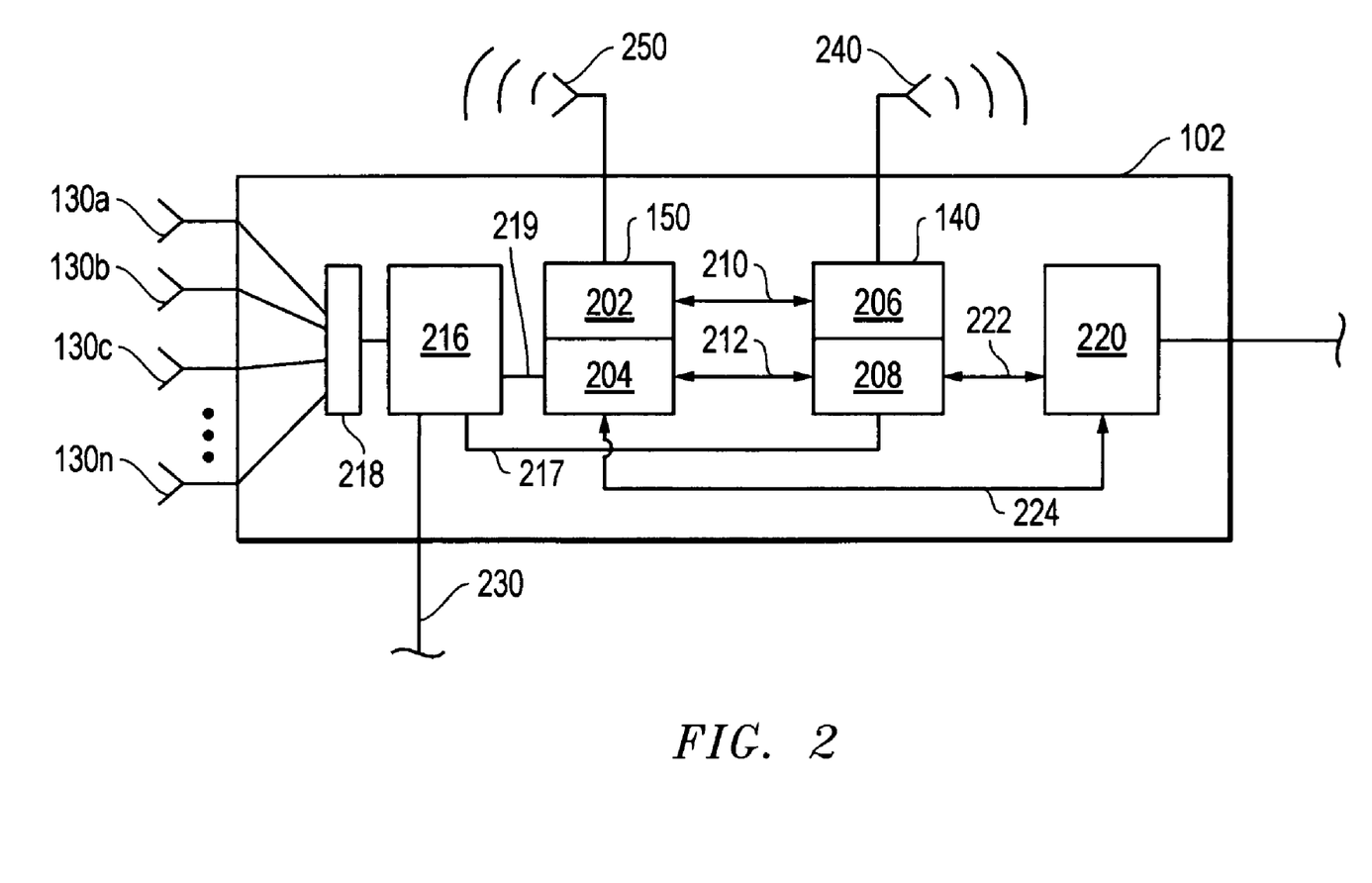
FIG. 2 is a simplified block diagram of a wireless network access point according to one exemplary embodiment, of the disclosed systems and methods.

FIG. 2 illustrates a block diagram of one exemplary implementation of access point 102 of FIG. 1. As shown, access point 102 includes UWB communication component 150 that in this embodiment includes UWB radio (e.g., transceiver) circuitry 202 coupled between UWB antenna 250 and UWB network software stack processing circuitry 204. Access point 102 also includes WiFi communication component 140 that in this embodiment includes WiFi radio (e.g., transceiver) circuitry 206 coupled between WiFi antenna 240 and WiFi network software stack processing circuitry 208. As shown, UWB radio circuitry 202 communicates via hardware communication path 210 with WiFi radio circuitry 206, e.g., for purposes of communicating RF spectrum planning information. UWB software stack 204 communicates via software communication path 212 with WiFi software stack 208 for purposes of communicating RF information and usage/application information. In the illustrated embodiment, UWB communication component 150 communicates with UWB client wireless devices using UWB antenna 250 and WiFi communication component 140 communicates with WiFi client wireless devices using WiFi antenna 240. Also shown present in the illustrated exemplary embodiment of access point 102 is optional external network interface 220 that may be present to communicate with external networks (e.g., such as the Internet 120 or other wired Ethernet devices or networks, etc.) communications between an external network (e.g., Internet 120) and each of UWB communication component 150 and WiFi communication component 140 via signal paths 222 and 224.

As illustrated in FIG. 2, access point 102 also includes RF spectrum controller 216 that is present to control operation of each of UWB communication component 150 and WiFi communication component 140, e.g., to control RF channel selection and to control RF transmission strength, etc. In this embodiment, RF spectrum controller 216 is also shown coupled to antenna array elements 130a to 130n via receiver circuitry 218. As will be described further herein, RF spectrum controller 216 may be so coupled via control paths 219 and 217 to control operation of respective communication component components 150 and 140 based at least in part on characteristics of the surrounding wireless communications environment as monitored by antenna array elements 130. Alternatively or additionally, RF spectrum controller 216 may control operation of respective communication component components 150 and 140 based at least in part on characteristics of the surrounding wireless communications environment as monitored by antenna array elements 240 and 250. As shown, an optional user interface 230 may be provided to allow a user to communicate with RF spectrum monitor 216. Alternatively or additionally, RF spectrum controller may be configured to communicate with user/s any other suitable manner, e.g., via external network and/or UWB or WiFi network communications.

It will be understood that the processing logic of each of UWB network software stack 204, WiFi network software stack 208, external network interface 220 and RF spectrum controller 216 may be implemented using any suitable configuration of one or more microprocessor/s and any suitable associated components, e.g., memory, storage, etc. It is also possible that the processing logic of each of UWB network software stack 204, WiFi network software stack 208, external network interface 220 and RF spectrum controller 216 may be implemented on a separate microprocessor, and/or that any two or more of these processing logic entities may be implemented on a common microprocessor. For example, although illustrated as a separate processing component in FIG. 2, it will be understood that the functionality of spectrum controller 216 may be implemented as part of either UWB communication component 150 or WiFi communication component 140. In such an alternate embodiment, a selected one of UWB communication component 150 or WiFi communication component 140 may be configured to act as a master that controls operation of the other communication component, e.g., via hardware communication path 210 and/or software communication path 212.

Figure 3:
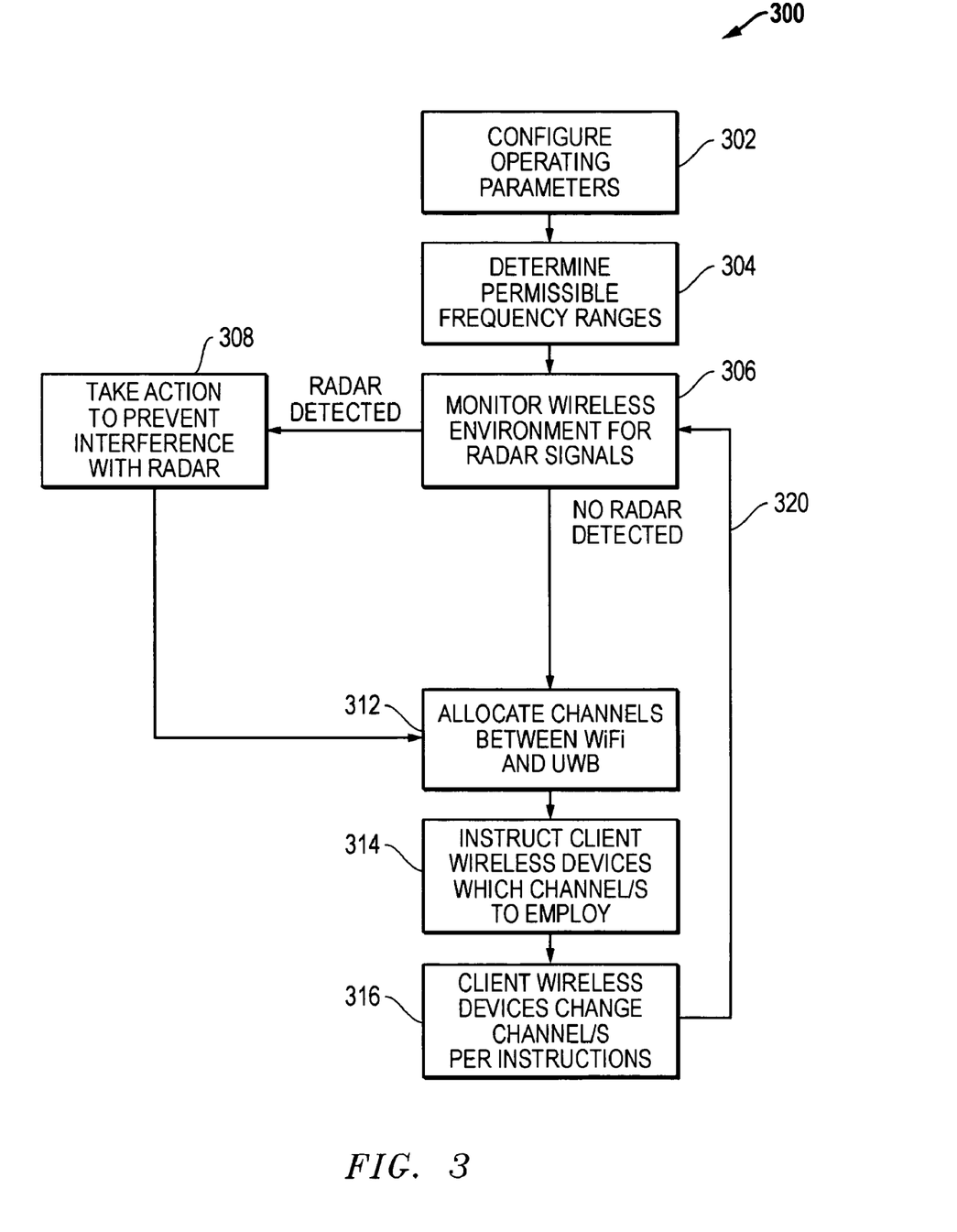
FIG. 3 illustrates RF spectrum management methodology according to one exemplary embodiment of the disclosed systems and methods.

FIG. 3 illustrates RF spectrum management methodology 300 as it may be implemented according to one exemplary embodiment of the disclosed systems and methods, e.g., using access point 102 of wireless communication environment 100. Exemplary methodology 300 begins in step 302 where operating parameters are configured by a user, e.g., by communicating information from the user to spectrum controller of 216 of access point 102 via using user interface 230. Such operating parameters may include information related to one or more inherent characteristics of the given network computing wireless network communication environment, information related to identity or other characteristics of wireless clients that may be encountered within the network computing wireless network communication environment, wireless network operating protocol information, etc. For example, in step 302 a user may specify the current country of operation and a list of UWB and WiFi wireless clients that may be encountered within the current network computing wireless network communication environment.

Based on the information provided in step 302, one or more ranges of permissible RF frequencies of operation for wireless network communications may be determined in step 304. For example, one or more ranges of permissible (e.g., legal) frequencies may be determined based on regulatory data for the given country of operation for the wireless technologies (e.g., UWB and WiFi) currently specified for use. In the embodiment of FIG. 2, such regulatory information may be contained in memory (e.g., firmware) that is accessed by spectrum controller 216 of access point 102. Ranges of permissible frequencies may be further defined based on other information, e.g., specific frequency capabilities of wireless client devices specified by the user, specific user-defined limits to frequency range, specified wireless networking protocol (e.g., 802.11h 802.11d), combinations thereof, etc.

As shown in step 306, the current network computing wireless network communication environment may be optionally monitored for radar signals, interfering signals or other non-network signals that may be present. In this regard, it will be understood that methodology 300 will be described herein in relation to monitoring for radar signals, but that similar methodology may be implemented for monitoring for other types of signals or combinations of signals (e.g., signals produced by other RF sources of interference present in the local spectrum used by the wireless communication technologies incorporated in a given access point configured as a multi-wireless technology intelligent switch in the manner described herein). In any case, monitoring of a wireless communication environment may be performed using any suitable RF detection device or combination of RF detection devices, external and/or internal to a wireless network access point or other information handling system device that is configured with a spectrum controller, e.g., such as antenna elements 130 of FIG. 2 that feed received RF signal information to spectrum controller 216 through receiver circuitry 218.

When the current network computing wireless network communication environment is monitored for non-network signals such as radar, one or more policies may be implemented to manage spectrum allocation for wireless communication technologies based on the presence and identity of detected non-network signals using attributes such as signal strength, frequency bands, power levels, signal to noise (S/N) ratio, etc. Such policies may be standard policies (e.g., 802.11h rules to be implemented in the presence of interfering signals such as radar signals, satellite signals or overlapping signals of another nearby WLAN or other type of wireless network operating in a next door office or home, etc.), or may be customized policies (e.g., custom policies designed to optimize wireless network communications by avoiding those frequencies at which interfering non-network signals are detected to be operating). Referring again to step 306 of FIG. 3, if radar signals are detected (e.g., military radar, commercial radar, airport radar, etc.), then action may be taken in step 308 to eliminate interference with radar by instructing wireless client devices of the affected wireless communication technology to avoid or move away from those channels that may interfere with the detected radar signal, e.g., by changing to alternate network communication frequencies that do not pose an interference risk, or by blocking all network communications where no such alternate frequencies are available. In one exemplary embodiment, spectrum controller 216 of access point 102 may implement step 308 by using messaging protocol to instruct UWB and/or WiFi wireless client devices to move to a channel/s that do not interfere with the detected radar signal. Similar methodology may be implemented to instruct wireless clients to move to UWB and/or WiFi channel/s that are less likely to be interfered with by detected non-network interference signals (e.g., such as from a microwave oven, etc.).

Besides allocating the RF spectrum of wireless network communications to avoid interference with non-network signals that are detected in a given network computing wireless network communication environment, it will be understood that other characteristics of wireless network communication may additionally or alternatively managed, e.g., in step 308 and/or other steps of FIG. 3. In this regard, policies may be implemented to adjust RF transmission power levels of wireless client devices so as to minimize potential for interference with other separate wireless communication systems (e.g., WLANs, etc.) that may be detected or suspected to be operating nearby. In this regard, standardized policies (e.g., 802.11h) and/or customized policies may be implemented to perform this function.

In step 312, channel/s may be allocated between multiple wireless technologies supported by a wireless network access point or other information handing system device that is configured with a spectrum controller, e.g., using a spectrum allocation policy such as described herein below. Wireless client devices may then be instructed in step 314 which channel/s are blocked for use by a given wireless technology, and which channels to employ according to the channel allocation of step 312. In one embodiment, such an instruction may be performed using known protocols for UWB and/or WiFi technologies (e.g., 802.11h, 802.11d, etc.) or using any other protocol suitable for communicating channel change instructions to wireless client devices. Wireless client devices may then change channel/s in step 316 according to the instructions of step 314. As indicated by loop 320 of FIG. 3, monitoring of the wireless environment may then be continuously performed so that channels may be reallocated as necessary to fit changing wireless network conditions.

Figure 4:
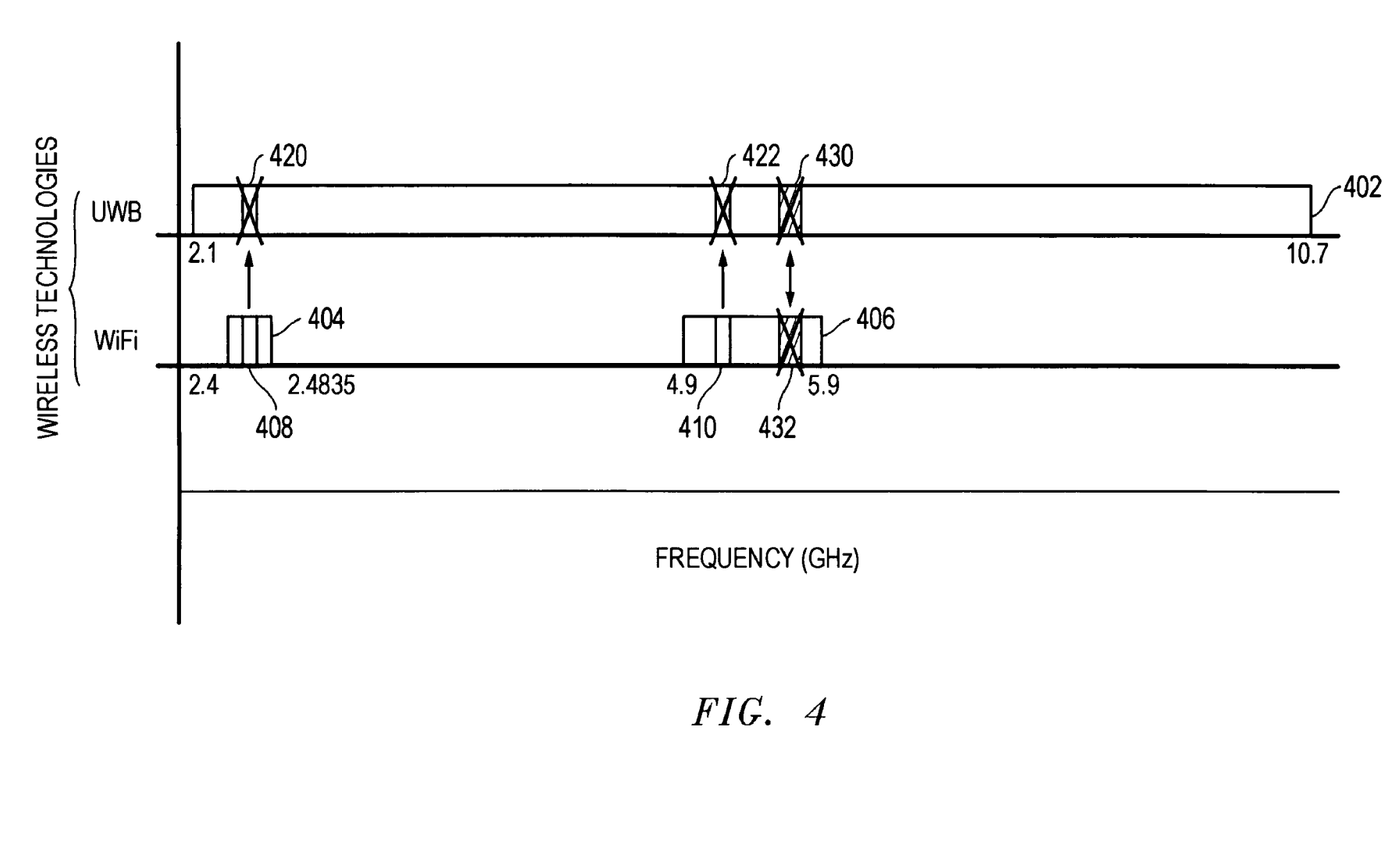
FIG. 4 illustrates spectrum management methodology according to one exemplary embodiment of the disclosed systems and methods.

Regarding step 312, channel allocation may be performed, for example, based on one or more pre-defined/default policies or one or more polices specified by a user to minimize or substantially eliminate interference between network devices (e.g., wireless client devices) communicating using these technologies. For example, FIG. 4 illustrates one exemplary embodiment of spectrum management methodology that may be employed in step 312. In this regard, FIG. 4 shows operating wireless technologies of a wireless network access point 102 and its associated wireless client devices of FIG. 1, including available UWB spectrum range 402 (in this example, an available range of 2.1 to 10.7 GHz) and available 802.11 WiFi WLAN spectrum ranges 404 (i.e., available range of 2.4 to 2.4835 GHz) and 406 (i.e., available range of 4.9 to 5.9 GHz). In the illustrated embodiment of FIG. 4, WiFi channels that encompass operating ranges 408 and 410 are currently in use for wireless communication by at least a portion of the wireless client devices of FIG. 1. It will be understood that spectrum ranges of FIG. 4 are exemplary only, and that the disclosed systems and methods may be implemented with other spectrum ranges. In this regard, spectrum ranges may vary with changes in regulations over time, with changes in regulatory environments (e.g., in different countries of the world), etc. For example, current FCC regulations specify a UWB spectrum range of from 3.1 to 10.6 GHz, although proposals exist in other countries for low power UWB operation at frequencies below 3.1 GHz and above 10.6 GHz.

Still referring to the exemplary embodiment of FIG. 4, a spectrum allocation policy has been set to allocate RF spectrum between wider-band (e.g., UWB) and narrower-band (e.g., WiFi) wireless technologies based on the RF channel/s 408 and 410 selected for use by the narrower-band (e.g., WiFi) wireless technology. In this regard, UWB channels 420 and 422 corresponding to frequencies of respective in-use WiFi channels 408 and 410 have been blocked or disallowed for use by the UWB wireless technology, as illustrated by the "X" marks across these channels in FIG. 4. In such a case, all other channels of UWB spectrum 402 are available for use unless blocked or disallowed for use based on another reason. Such a spectrum allocation policy may be desirable, for example, because the available UWB spectrum range 402 is much wider than either of the available narrower WiFi spectrum ranges 404 or 406, meaning that it may be easier to find alternate UWB channel/s than to find alternate WiFi channel/s when it is necessary to avoid a channel overlap between the two technologies. However, it will be understood that any other policy suitable for reducing or substantially eliminating overlap between two or more wireless technologies may be employed, including allocating RF spectrum between wider-band (e.g., UWB) and narrower-band (e.g., WiFi) wireless technologies based on the RF channel/s selected for use by the wider-band wireless technology rather than the narrower-band wireless technology. A spectrum allocation policy may optionally and additionally be implemented to select the appropriate wireless technologies (e.g., WiFi versus UWB) based at least in part on parameters (e.g., characteristics or requirements) of particular applications executing on network devices and communicating in the wireless environment, e.g., selection of appropriate wireless communication technology to meet priority, latency and/or bandwidth requirements of a particular application.

FIG. 4 also illustrates UWB channels 430 and WiFi channels 432 that have been optionally blocked for other reasons, e.g., to avoid interference from a non-network source or to prevent interference with radar signals detected in step 306. As previously described, wireless client devices may be instructed in step 314 which channel/s (e.g., channels 432) are blocked for use by WiFi wireless technology, and which channels (e.g., channels 420, 422 and 430) are blocked for use by UWB wireless technology according to the channel allocation of step 312. Wireless client devices may also be instructed in step 314 as to which of the remaining available channel/s are to be used for each of WiFi and UWB communications (e.g., so that all UWB wireless client devices communicate on the same selected UWB frequency and so that all WiFi wireless client devices communicate on the same selected WiFi frequency). In one embodiment, such instructions may be communicated to wireless client devices from a spectrum controller of an information handling system (e.g., wireless network access point 102) using known protocols for UWB and/or WiFi technologies (e.g., 802.11h, 802.11d, etc.) or using any other protocol suitable for communicating channel change instructions to wireless client devices. Wireless client devices may then change channel/s in step 316 according to the instructions of step 314.

It will be understood that methodology 300 of FIG. 3 is exemplary only, and that any combination of additional or fewer steps may be employed, and/or that the illustrated steps may be performed in any other order, that is suitable for implementing one or more of the spectrum management features of the disclosed systems and methods as are described elsewhere herein. It will also be understood that the wireless technology spectrum embodiment illustrated and described in relation to FIG. 4 is exemplary only, and that the disclosed systems and methods may be implemented to manage wireless technology spectra for multiple networking wireless technologies as they may be implemented to enable network computing wireless communications for any wireless computing network type or combinations thereof including, but not limited to, WWAN, WLAN, WMAN, WPAN, etc. Specific examples include, but are not limited to, WLAN based technologies such as 802.11 WiFi (2.4 GHz and 5.0 GHz); WPAN based technologies such as Bluetooth (2.4 GHz) and UWB (3.1-10.6 GHz); WWAN based technologies such as GSM/EDGE, HSDPA, W-CDMA, CDMA-2000 (800-900 MHz, 1800-1900 MHz and 2.1 GHz); WMAN based technologies such as 802.16 WiMax (2-11 GHz), etc.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A wireless network access point comprising an information handling system configured to manage simultaneous RF spectrum use by two or more network computing wireless technologies operating in the same wireless communication environment, said information handling system being configured to:

allocate said RF frequency spectrum for use by a first client device by instructing said first client device to employ a first channel within said RF frequency spectrum for communication by a first network computing wireless technology; and allocate said RF frequency spectrum for use by a second client device simultaneously with said use of said RF frequency spectrum by said first client device by instructing said second client device to employ a second channel within said RF frequency spectrum for communication using a second network computing wireless technology;

wherein said information handling system is configured to communicate with multiple first client devices that each communicate by said first network computing wireless technology; wherein said information handling system is configured to communicate with multiple second client devices that each communicate by said second network computing wireless technology; and wherein said information handling system is further configured to:

allocate said RF frequency spectrum for use by said multiple first client devices by instructing all of said multiple first client devices to transmit to each other using said first channel; and allocate said RF frequency spectrum for use by said multiple second client devices simultaneously with said use of said RF frequency spectrum by said multiple first client devices by instructing all of said second multiple client devices to transmit to each other using said second channel.

2. The wireless network access point of claim 1, wherein at least a portion of said RF spectrum is unlicensed; and wherein said information handling system is configured to monitor usage characteristics for said RF spectrum, and to reallocate use of said RF spectrum by said second client device simultaneously with said use of said RF frequency spectrum by said first client device by instructing said second client device to change to another channel within said RF frequency spectrum for communication by said second network computing wireless technology based at least in part on said monitored usage characteristics of said RF spectrum.

3. The wireless network access point of claim 2, wherein said monitored usage characteristics for said RF spectrum comprises a combination of each of the following characteristics: identity of used RF channels within said RF spectrum by at least one of said two or more network computing wireless technologies, level of transmission power strength of at least one of said two or more wireless technologies operating within said RF spectrum, and presence of non-network or interfering signals within said RF spectrum.

4. The wireless network access point of claim 2, wherein said monitored usage characteristics for said RF spectrum comprises identity of one or more RF channels used within said RF spectrum by at least one of said two or more network computing wireless technologies.

5. The wireless network access point of claim 1, wherein said two or more network computing technologies comprise ultra wide band (UWB) and Wireless Fidelity (WiFi) network computing technologies.

6. The wireless network access point of claim 1, wherein said two or more network computing wireless technologies comprise at least one wireless local area network (WLAN) technology and at least one wireless personal area network (WPAN) technology.

7. The wireless network access point of claim 1, wherein said information handling system is further configured to:

select a first one of said two or more network computing wireless technologies for use by a first application executing on at least one of said first and second client devices based at least in part on one or more characteristics of said first application, said one or more application characteristics of said first application comprising at least one of first application priority, first application latency, first application bandwidth requirement, or a combination thereof; and select a second and different one of said two or more network computing wireless technologies for use by a second application executing on at least one of said first and second client devices based at least in part on one or more characteristics of said second application, said one or more application characteristics of said second application comprising at least one of second application priority, second application latency, second application bandwidth requirement, or a combination thereof.

8. The wireless network access point of claim 1, wherein said information handling system comprises an array of antennas and is configured to profile the available wireless spectrum using said array of antennas and then to pre-assign specific spectrum masks for said multiple first client devices and said multiple second client devices based on said profiled wireless spectrum and combination of a given usage model with a specific application type used by each of said respective first and second client devices, said spectrum mask pre-assigned for said multiple first client devices being different than said spectrum mask pre-assigned for said multiple second client devices.

9. The information handling system of claim 1, wherein said information handling system is further configured to adjust RF transmission power levels of said multiple first client devices so as to minimize potential for interference with another separate wireless communication system detected to be operating in the same wireless communication environment.

10. An information handling system configured as a wireless network access point, said information handling system comprising:

a first wireless network technology communication component configured to communicate using a first network computing wireless technology;

a second wireless network technology communication component configured to communicate simultaneously with said first wireless network technology communication component using a second network computing wireless technology; and an RF spectrum controller coupled to control operation of said first and second wireless network technology communication components;

wherein said information handling system is configured to:
allocate said RF frequency spectrum for use by a first client device by instructing said first client device to employ a first channel within said RF frequency spectrum for communication by a first network computing wireless technology, and allocate said RF frequency spectrum for use by a second client device simultaneously with said use of said RF frequency spectrum by said first client device by instructing said second client device to employ a second channel within said RF frequency spectrum for communication using a second network computing wireless technology;

wherein said information handling system is configured to communicate with multiple first client devices that each communicate by said first network computing wireless technology; wherein said information handling system is configured to communicate with multiple second client devices that each communicate by said second network computing wireless technology; and wherein said information handling system is further configured to:

allocate said RF frequency spectrum for use by said multiple first client devices by instructing all of said multiple first client devices to transmit to each other using said first channel; and allocate said RF frequency spectrum for use by said multiple second client devices simultaneously with said use of said RE frequency spectrum by said multiple first client devices by instructing all of said second multiple client devices to transmit to each other using said second channel.

11. The information handling system of claim 10, further comprising an external network interface coupled between an external network and each of said first wireless network technology communication component and said second wireless network technology communication component.

12. The information handling system of claim 10, further comprising a wireless environment monitor coupled to said RF spectrum controller.

13. The information handling system of claim 10, wherein at least a portion of said RF spectrum is unlicensed; and wherein said spectrum controller is configured to monitor usage characteristics for said RF spectrum, and to adjust use of said RF spectrum by at least one of said first and second wireless network technology communication components based at least in part on said monitored usage characteristics of said RF spectrum.

14. The information handling system of claim 13, wherein said monitored usage characteristics for said RF spectrum comprises a combination of each of the following characteristics: identity of used and non-used RF channels within said RF spectrum by at least one of said two or more network computing wireless technologies, level of transmission power strength of at least one of said two or more wireless technologies operating within said RF spectrum and presence of non-network or interfering signals within said RF spectrum.

15. The information handling system of claim 13, wherein said monitored usage characteristics for said RF spectrum comprises identity of one or more RF channels used within said RF spectrum by at least one of said first and second network computing wireless technologies.

16. The information handling system of claim 10, wherein said first network computing technology comprises a wireless local area network (WLAN) computing technology; and wherein said second network computing technology comprises a wireless personal area network (WPAN) computing technology.

17. The information handling system of claim 10, wherein said first network computing technology comprises an ultra wide band (UWB) computing technology; and wherein said second network computing technology comprises a Wireless Fidelity (WiFi) network computing technology.

18. The wireless network access point of claim 10, wherein said information handling system comprises an array of antennas and is configured to profile the available wireless spectrum using said array of antennas and then to pre-assign specific spectrum masks for said multiple first client devices and said multiple second client devices based on said profiled wireless spectrum and combination of a given usage model with a specific application type used by each of said respective first and second client devices, said spectrum mask pre-assigned for said multiple first client devices being different than said spectrum mask pre-assigned for said multiple second client devices.

19. The information handling system of claim 10, wherein said information handling system is further configured to adjust RF transmission power levels of said multiple first client devices so as to minimize potential for interference with another separate wireless communication system detected to be operating in the same wireless communication environment.

20. An RF spectrum management method, comprising using an information handling system configured as a wireless network access point to manage simultaneous RF spectrum use by two or more network computing wireless technologies operating in the same wireless communication environment, wherein said method comprises:
   allocating said RF frequency spectrum for use by a first client device by instructing said first client device to employ a first channel within said RF frequency spectrum for communication by a first network computing wireless technology; and
   allocating said RF frequency spectrum for use by a second client device simultaneously with said use of said RF frequency spectrum by said first client device by instructing said second client device to employ a second channel within said RF frequency spectrum for communication using a second network computing wireless technology; and wherein said method further comprises:
   allocating said RF frequency spectrum for use by multiple first client devices by instructing all of said multiple first client devices to transmit to each other using said first channel, each of said multiple first client devices communicating by said first network computing wireless technology; and
   allocating said RF frequency spectrum for use by multiple second client devices simultaneously with said use of said RF frequency spectrum by said multiple first client devices by instructing all of said second multiple client devices to transmit to each other using said second channel, each of said multiple second client devices communicating by said second network computing wireless technology.

21. The method of claim 20, wherein at least a portion of said RF spectrum is unlicensed; and wherein said method further comprises monitoring usage characteristics for said RF spectrum, and reallocating use of said RF spectrum by said second client device simultaneously with said use of said RF frequency spectrum by said first client device by instructing said second client device to change to another channel within said RF frequency spectrum for communication by said second network computing wireless technology based at least in part on said monitored usage characteristics of said RF spectrum.

22. The method of claim 21, wherein said monitored usage characteristics for said RF spectrum comprises a combination of each of the following characteristics: identity of used RF channels within said RF spectrum by at least one of said two or more network computing wireless technologies, level of transmission power strength of at least one of said two or more wireless technologies operating within said RF spectrum, and presence of non-network or interfering signals within said RF spectrum.

23. The method of claim 21, wherein said monitored usage characteristics for said RF spectrum comprises identity of one or more RF channels used within said RF spectrum by at least one of said two or more network computing wireless technologies.

24. The method of claim 20, wherein said two or more network computing technologies comprise ultra wide band (UWB) and Wireless Fidelity (WiFi) network computing technologies.

25. The method of claim 20, wherein said two or more network computing wireless technologies comprise at least one wireless local area network (WLAN) technology and at least one wireless personal area network (WPAN) technology.

26. The method of claim 20, wherein said method further comprises:
   selecting a first one of said two or more network computing wireless technologies for use by a first application executing on at least one of said first and second client devices based at least in part on one or more characteristics of said first application, said one or more application characteristics of said first application comprising at least one of first application priority, first application latency, first application bandwidth requirement, or a combination thereof; and,
   selecting a second and different one of said two or more network computing wireless technologies for use by a second application executing on at least one of said first and second client devices based at least in part on one or more characteristics of said second application, said one or more application characteristics of said second application comprising at least one of second application priority, second application latency, second application bandwidth requirement, or a combination thereof.

27. The method of claim 20, further comprising:
   using an array of antennas to profile the available wireless spectrum; and
   then pre-as signing specific spectrum masks for each of said multiple first client devices and said second multiple client devices based on said profiled wireless spectrum and combination of a given usage model with a specific application type used by each of said respective first and second client devices, said spectrum mask pre-assigned for said multiple first client devices being different than said spectrum mask pre-assigned for said multiple second client devices.

28. The method of claim 20, further comprising simultaneously using said RF spectrum by said two or more network computing wireless technologies by using said first client device to employ said first channel within said RF frequency spectrum to communicate by said first network computing wireless technology; and using said second client device to employ said second channel within said RF frequency spectrum to communicate by said second network computing wireless technology simultaneously with said use of said RF frequency spectrum by said first client device.

29. The method of claim 20, further comprising adjusting RF transmission power levels of said multiple first client devices so as to minimize interference with another separate wireless communication system detected to be operating in the same wireless communication environment.

30. An information handling system configured as a wireless network access point, said information handling system comprising:
   a first wireless network technology communication component configured to communicate using a first network computing wireless technology;
   a second wireless network technology communication component configured to communicate simultaneously with said first wireless network technology communication component using a second network computing wireless technology; and
   an RF spectrum controller coupled to control operation of said first and second wireless network technology communication components;
   wherein said information handling system is configured to:
      allocate said RF frequency spectrum for use by a first client device by instructing said first client device to employ a first channel within said RF frequency spectrum to transmit by a first network computing wireless technology, and allocate said RF frequency spectrum for use by a second client device simultaneously with said use of said RF frequency spectrum by said first client device by instructing said second client device to employ a second channel within said RF frequency spectrum to transmit using a second network computing wireless technology.

* * * * *

UNITED STATES PATENT AND TRADEMARK OFFICE
CERTIFICATE OF CORRECTION

PATENT NO.      : 7,599,686 B2                                              Page 1 of 1
APPLICATION NO. : 11/124587
DATED           : October 6, 2009
INVENTOR(S)     : Quinn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 485 days.

Signed and Sealed this

Twenty-eighth Day of September, 2010

David J. Kappos
*Director of the United States Patent and Trademark Office*